United States Patent [19]

Cosack

[11] Patent Number: 5,096,575

[45] Date of Patent: Mar. 17, 1992

[54] DISPOSABLE FILTER UNIT

[75] Inventor: Klaus Cosack, Dassel, Fed. Rep. of Germany

[73] Assignee: Schleicher & Schuell GmbH, Fed. Rep. of Germany

[21] Appl. No.: 544,801

[22] Filed: Jun. 27, 1990

Related U.S. Application Data

[63] Continuation of Ser. No. 309,244, Feb. 13, 1989, abandoned.

[30] Foreign Application Priority Data

Feb. 12, 1988 [DE] Fed. Rep. of Germany ....... 3804429

[51] Int. Cl.$^5$ ............................................... B01D 29/00
[52] U.S. Cl. ...................................... 210/94; 210/238; 210/447; 422/101; 55/503
[58] Field of Search ................. 210/94, 232, 238, 445, 210/446, 447, 927; 422/100, 101; 55/495, 503

[56] References Cited

U.S. PATENT DOCUMENTS

| | | | |
|---|---|---|---|
| 3,658,183 | 4/1972 | Best et al. | 210/446 |
| 3,823,824 | 7/1974 | Close | 210/94 |
| 3,834,543 | 9/1974 | Dreues | 210/232 |
| 3,932,153 | 1/1976 | Byrns | 210/446 |
| 4,287,065 | 9/1981 | Raines | 210/445 |
| 4,614,585 | 9/1986 | Mehra et al. | 210/445 |
| 4,902,415 | 2/1990 | Lemonnier | 210/321.84 |

*Primary Examiner*—Robert A. Dawson
*Assistant Examiner*—Wanda L. Millard
*Attorney, Agent, or Firm*—Lowe, Price, LeBlanc & Becker

[57] ABSTRACT

The disposable filter unit according to the present invention comprises a filter fixing member 3 with a socket-type recess 7 into which the front side of a feed member 2 interspersed with a feed channel 4 is inserted sealingly. Between these two members, a filter element 12 is inserted, which filter element is supported by the ground 15 of the socket-type recess 7 inside the filter fixing member 3. The edges 13 and 16 of the feed member 2 and the filter fixing member 3 are knife-type cutting edges such that, when these two members are put together, the filter element 12 is cut to size from a sheet-type filter material. Furthermore, the invention relates to a method for manufacturing disposable filter units. This method is characterized by that several feed members and several filter fixing members are put together simultaneously, whereat the filter elements are simultaneously cut to size from a sheet-type filter material, for example from a leaf-type or a ribbon-type filter material.

8 Claims, 1 Drawing Sheet

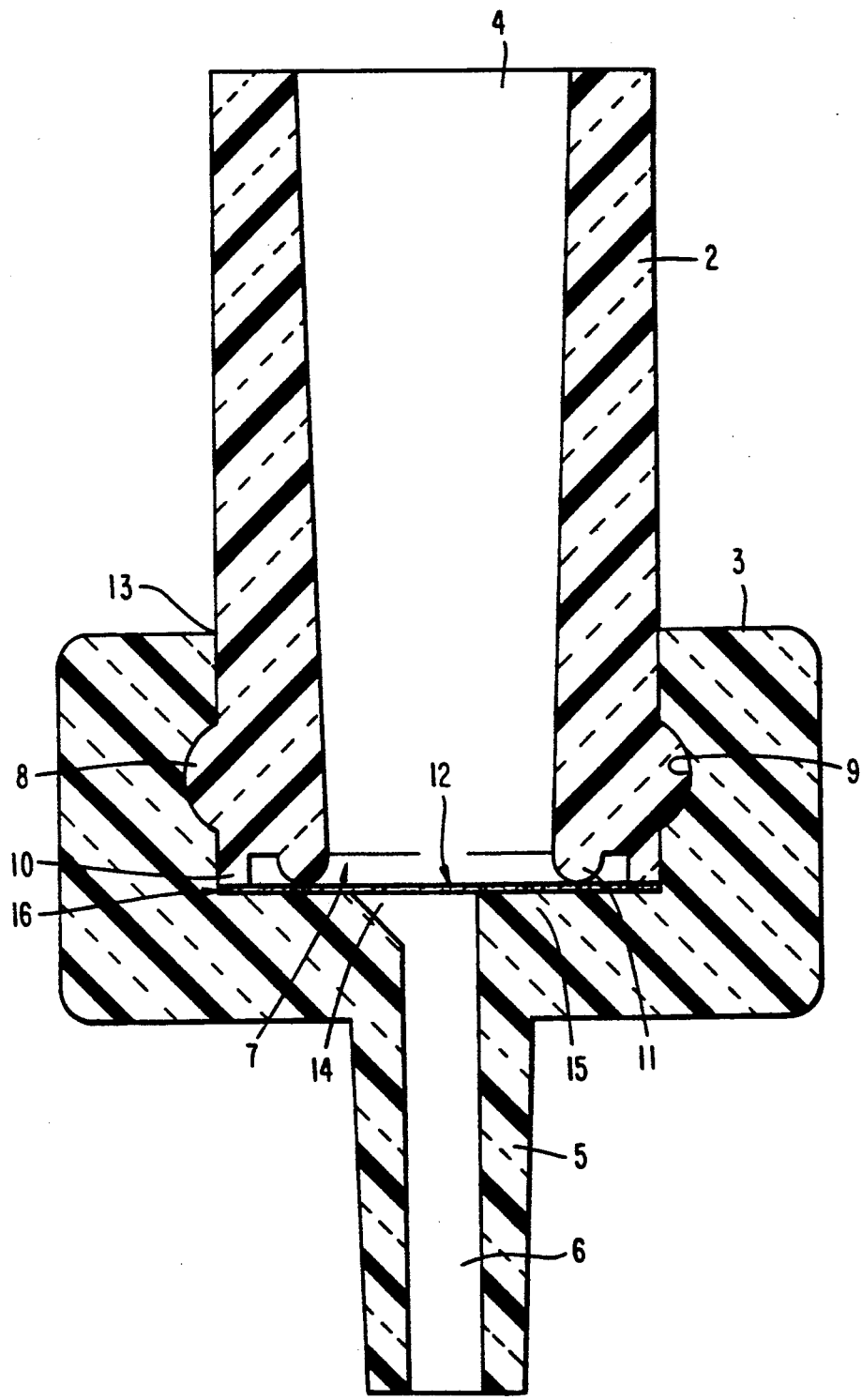

DISPOSABLE FILTER UNIT

This application is a continuation of application Ser. No. 309,244, filed Feb. 13, 1989, now abandoned.

The present invention relates to a disposable filter unit according to the generic part of claim 1.

Such disposable filter units are known per se and they are used in different fields of application. For instance, they are used for medical, pharmaceutical and environmental protection purposes and they are used in chemical and biological laboratories. These disposable filter units can be used for pressure filtration as well as for gravity filtration. Mostly, they are employed when relatively small volumina of a fluid have to be filtered. Together with the filter element inserted, such disposable filter units are used only once.

Disposable filter units according to the generic part of claim 1 are products of mass manufacturing. Usually, they are made of plastics. The filter element of such a disposable filter unit mostly is a diaphragm or a filter paper. The filter element may be produced in one single layer or in several layers.

When producing such disposable filter units, the filter element is fixed between an upper housing part, for example a feed member, and a lower housing part, for example a filter fixing element.

When assembling disposable filter units according to the state of the art, first of all, the filter element which has to be cut to size is inserted into the lower housing part. Afterwards, the upper housing part is inserted into the lower housing part, too, and both housing parts have to be connected gas and liquid sealingly.

According to the state of the art, the lower and the upper housing part are usually made of thermoplastic plastics.

It is a disadvantage of such known disposable filter units that the filter element or the filter diaphragm, respectively, have to be cut to size before being inserted into the housing. This manufacturing method is very labor-consuming.

It is a further disadvantage of the small disposable filter units according to the state of the art, which are used for small fluid volumina to be filtered, that the filter elements, which are necessarily small, too, for example with a diameter of about 3 mm, can be handled only with great difficulties when the filter unit is assembled. Thus, for example, the filter elements may be moved away easily already by slow movements of the air or they may slip away or they may be inserted in a wrong position.

Accordingly, it is an object of the present invention to provide a disposable filter unit which can be assembled simply and easily. It is a further object to provide a method for manufacturing a disposable filter unit, which method can be practiced easily and economically.

Thus, the disposable filter unit according to the present invention comprises a feed member which is inserted into a socket-type recess inside a filter fixing member. The feed member may be a feed pipe or a sleeve shaped like a suction strainer. The liquid to be filtered is filled into a feed channel inside the feed pipe or into the cavity of the suction strainer, respectively.

The filter element is fixed between the ground of the socket-type recess of the filter fixing member and the front side of the feed member. The liquid to be filtered flows from the feed channel through the filter element to an outlet channel opening to the ground of the filter fixing member and leading into an outlet pipe through which the filtrate is discharged.

The inner edge of the filter fixing member at the opening of the socket-type recess represents a knife-type cutting edge, which acts in combination with a knife-type cutting edge which is formed at the peripheral edge at that front side of the feed member facing the filter fixing member.

Thus, for example, the edge at the opening of the socket-type recess and the edge of the feed member, which both can be called corner-type edges, may be rectangular. The dimensions of the socket-type recess and the front side of the feed member inserted are chosen such that the cutting edge or the cutting corner, respectively, of the feed member comes as close as possible to the cutting edge or the cutting corner, respectively, of the socket-type recess, when the feed member approaches the socket-type recess. However, it has to be ensured that the feed member can be inserted into the socket-type recess. When both edges or corners, respectively, come into contact with each other, they act as cutting edges. When the socket-type recess is covered with the sheet-type filter material, which is larger than the socket-type recess, before assembling the filter unit, a filter element is cut to size from the sheet-type or leaf-type filter material when the feed member is inserted into the socket-type recess and the above described cutting edges come into contact with each other. The filter element cut to size falls to the ground of the socket-type recess and is fixed by the feed member as soon as the feed member has reached its final position.

Preferably, the socket-type recess inside the filter fixing member and the front side of the feed member inserted into the socket-type recess are cylindrically-shaped and dimensioned such that the outer wall of the front side of the feed member inserted comes as close as possible to the side wall of the socket-type recess. In this configuration, the feed channel provided inside the feed member is arranged coaxially with respect to the cylindrically-shaped feed member. The outlet channel inside the filter fixing member and inside the outlet pipe is preferably arranged centrally, too, comprises a circular cross-section and is arranged in true alignment with respect to the feed channel such that the liquid to be filtered and the filtrate, respectively, have to overcome a flow resistance which is as low as possible.

According to a further preferred embodiment of the present invention, the feed member comprises an axially extending circularly-closed ring-type punching lip at its front side facing the filter fixing member. In particular, this punching lip comprises a rectangular cross-section. Its peripheral, which means radially outer edge, which is preferably right-angled, represents the cutting edge of the feed member. Preferably, the front side of this cutting edge limiting the punching lip in axial direction extends parallel to the ground of the socket-type recess. Between this front side and the ground, the filter element is fixed.

According to another preferred embodiment, the feed member comprises at its front side facing the filter fixing element an axially extending toric projection serving for sealing and showing in particular a semi-circular cross-section. This toric projection encloses circularly-closed the opening of the feed channel. This toric projection serves also for attaching and fixing the filter element, which is fixed between the toric projection and, if need be, the punching lip on one side and the ground of the socket-type recess on the opposite side.

If the feed member comprises a punching lip, the toric projection serving for sealing and fixing and the punching lip extend axially for about the same distance.

The inner diameter of this annular toric projection is dimensioned such that it is larger than the diameter of the outlet channel at its opening to the ground of the socket-type recess inside the filter fixing element. Nevertheless, the toric projection should press the filter element to the ground of the socket-type recess as close as possible at the edge of the opening of the outlet channel on the ground to enable a filtration which is in no way disturbed.

Preferably, at least one funnel- or notch-type groove is formed in that part of the ground of the socket-type recess inside the filter fixing member which comprises the outlet channel to improve the discharge action of the filtrate. In this case, naturally, the diameter of the ring-type toric projection serving for sealing and fixing has to be larger than the diameter formed by the peripheral edges of the funnel- or notch-type grooves in the ground of the socket-type recess inside the filter fixing element.

Preferably, the disposable filter unit according to the present invention comprises a self-locking snap-on or push-to-lock mounting device between the filter fixing member and the feed member for fixing the feed member inside the socket-type recess inside the filter fixing member such that the front side of the feed member facing the filter fixing member or the punching lip, respectively, and/or, if need be, the toric projection serving for sealing and fixing are pressed against the filter element such that the filter element itself is pressed stationarily against the ground of the socket-type recess.

Preferably, this connection consists of a radially enclosing groove-type recess in the side wall of the socket-type recess into which a toric projection circularly enclosing the outer wall of the feed member can snap or latch. The groove-type recess and the toric projection serving for locking comprise each an at least essentially semi-circular cross-section corresponding to each other.

Preferably, the feed member and the filter fixing element are formed in one part each and are made of plastics, especially of transparent plastics. Both parts are preferably manufactured by injection molding.

A further subject of the present invention is a method for manufacturing disposable filter units. According to this method, several feed members are inserted simultaneously into the socket-type recesses of several filter fixing members, whereat, when the members are assembled, the corresponding filter elements are cut simultaneously from one single sheet-type filter material. Thus, several, which means two or more, for example four, six or eight . . . disposable filter units are assembled, whereat, at the same time, the corresponding filter elements are cut from one single sheet-type or ribbon-type filter material.

This method is especially suitable for small disposable filter units according to the present invention which are used for the filtration of only small volumina of a fluid. Such disposable filter units are products of mass manufacturing as described above.

According to this method, preferably, a first mounting plate is provided with several filter fixing members and a second mounting plate is provided with several feed members such that, when the two mounting plates approach each other, the feed members are inserted into the corresponding filter fixing members, whereat simultaneously the corresponding filter elements are cut from one single sheet-type filter material.

The mounting plates preferably are fixed to a multiple tooling center or to a revolving transfer turntable, respectively.

First of all, both mounting plates are assembled either with feed members or with filter fixing elements. Then, the revolving transfer turntable is turned into a predetermined position where the mounting plates can be moved by suitable tools with respect to each other such that the feed members can be inserted into the filter fixing members. At the same time, a sheet-type filter material, from which the filter elements are cut, is inserted between the two approaching mounting plates. Preferably, the sheet-type filter material is a ribbon-type filter material which is moved forwardly for a certain length when the cutting action is finished.

When the assembly of the feed members and the filter fixing members is finished, both mounting plates are turned away from the assembly station by a revolving movement of the revolving transfer turntable. Afterwards, the assembled disposable filter units are taken out of the mounting plates by suitable devices.

In the following, the invention is explained in more detail with an embodiment shown in the only figure. This figure shows a longitudinal section through a disposable filter unit according to the present invention.

The illustrated disposable filter unit consists essentially of a feed member 2, a filter fixing member 3 and a filter element 12 fixed between the first two parts.

The feed member 2 represents a cylindrically-shaped feed pipe inside which centrally a feed channel 4 extends, which is open at both sides and the inner diameter of which decreases in direction to the filter element 12.

The feed pipe 2 is inserted with its front side into a socket-type recess 7 inside the filter fixing element 3, which socket-type recess is cylindrically shaped and coaxial with respect to the feed pipe 2. The opening of the feed channel 4 facing the filter fixing member 3 is enclosed by an axially extending toric projection 11 comprising an at least essentially semi-circular cross-section. The subtense of this semi-circle extends orthogonally to the axis of the feed pipe 2.

Furthermore, the feed pipe 2 comprises a punching lip, which encloses the front side, which is inserted into the socket-type recess, circularly closed and which extends axially. The outer diameter of this ring-type punching lip is the same as the outer diameter of the feed pipe 2. The inner diameter is smaller than the outer diameter of the toric projection 11 described above.

The punching lip 10 and the toric projection serving for sealing 11 extend axially for about the same length and press to the filter element 12, by which fact the filter material is compressed and a sealing connection to the filter fixing member is achieved. This pressure is obtained by a snap-on connection, which will be explained below, The radially outer edge or the radially outer corner, respectively, of the punching lip 10 is shaped rectangularly and forms a knife-type cutting edge 16.

The cutting edge 13 corresponding to the cutting edge 16 is formed by the edge at the opening of the socket-type recess 7 inside the filter fixing member 3. This edge, too, is rectangularly shaped. When the feed pipe 2 is inserted into the socket-type recess 7, a filter element is cut to size from a sheet-type filter material by the action in combination of the cutting edges 13 and 16.

The outer wall of the feed pipe 2 comprises a circularly enclosing toric projection 8, which is snapped into a corresponding annular groove 9 such that an axially acting pressure is generated, which is transferred by the toric projection 11 serving for sealing and by the frontsides of the punching lip 10, too, to the filter element 12 such that the filter material is compressed and the feed channel 4 or the feed pipe 2, respectively, is separated sealingly from the filter fixing member 3.

The filter fixing element 3 is cylindrically shaped, too, and comprises centrally in axial direction an outlet pipe 5 inside which coaxially an outlet channel extends, which leads into the socket-type recess 7. Around this opening, several funnel-type arranged notch-type recesses 14 are cut into the ground 15 of the socket-type recess 7 to improve the discharge action of the filtrate pressed through the filter element 12.

The feed channel 4 and the outlet channel 6 are arranged in true alignment whereat the diameter of the outlet channel 6 is smaller than the diameter of the feed channel 4.

The ground 15 is flat, extends rectangular to the axis of the feed channel 4 and the outlet channel 6 and serves inter alia as a support member for the filter element 12, too.

The feed member 2 and the filter fixing member 3 are made of transparent plastics by injection molding.

By the way, the outer diameter of the outlet pipe decreases in flow direction.

The disposable filter unit according to the present invention illustrated in the figure comprises for example the following dimensions: diameter of the feed pipe 2 =7.0 mm; diameter of the feed channel 4=3.5 to 4.32 mm; diameter of the outlet channel=1.2 mm; diameter of the disc-type filter element enclosed by the toric projection 11 serving for the filtration=about 3.5 mm.

I claim:

1. A disposable filter unit comprising a filter fixing member having a socket-type recess and a feed member having a front side sealingly inserted into said socket-type recess, a feed channel in said feed member and a filter element in communication with said feed channel and having at least substantially the same diameter as the socket-type recess, said filter element fixed between a ground of the socket-type recess and the front side of the feed member wherein the filter fixing member includes an outlet pipe with an outlet channel therein, said outlet pipe extending through the filter fixing member and said outlet channel communicating with the feed channel through the socket-type recess, wherein an outer peripheral edge of the feed member facing the filter fixing member and an inner edge of a side wall of the socket-type recess respectively define a pair of knife-type cutting edges together forming a cutting tool device, wherein the filter element is cut to size from a sheet-type filter material by said cutting tool device during the assembly of the feed member into the socket-type recess, said filter member thereby having a peripheral edge in contact with at least one cutting edge, and wherein an axially outer portion of the feed member is in contact with the filter member after assembly.

2. A disposable filter unit according to claim 1, wherein the feed member and the socket-type recess are cylindrically-shaped, and the feed channel and the outlet channel are arranged centrally and in true alignment.

3. A disposable filter unit according to claim 1, wherein the feed member comprises at its front side facing the filter fixing member an axially extending circularly-closed right-type punching lip in particular comprising a rectangular cross-section, the radially outward edge of said ring-type punching lip being said outer peripheral edge of the feed member and constituting the knife-type cutting edge.

4. A disposable filter unit according to claim 1 further comprising an axially extending toric projection serving for sealing at the front side of the feed member facing the filter fixing member enclosing circularly an opening of the feed channel.

5. A disposable filter unit according to claim 1, further comprising a self-locking snap-on or push-to-lock mounting device between the filter fixing member and the feed member, comprising an annular groove-type recess formed in the side wall of the socket-type recess, and a toric projection circularly enclosing an outer wall of the feed member projecting into the groove-type recess when the mounting device is locked.

6. A disposable filter unit according to claim 5, wherein the groove-type recess and the toric projection serving for locking comprise each a mutually corresponding at least essentially semi-circular cross-section.

7. A disposable filter unit according to claim 1, further comprising at least one funnel- or notch-type recess in a part of the ground of the socket-type recess inside the filter fixing member, said recess being in an opening of the outlet channel.

8. A disposable filter unit according to claim 1, wherein the feed member and the filter fixing member are formed in one part each, that they are formed in particular by injection molding and that they are made of transparent plastics.

* * * * *